United States Patent
Kersey et al.

(10) Patent No.: US 6,489,606 B1
(45) Date of Patent: Dec. 3, 2002

(54) BRAGG GRATING SENSOR SYSTEM WITH SPECTRAL RESPONSE OR CODE DIVISION MULTIPLEXING

(75) Inventors: Alan D. Kersey, S. Glastonbury, CT (US); Robert A. Rubino, Tolland, CT (US); James R. Dunphy, S. Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/545,792

(22) Filed: Apr. 7, 2000

(51) Int. Cl.[7] ................................................. G02B 6/00
(52) U.S. Cl. ......................... 250/227.14; 250/227.18; 385/13
(58) Field of Search ................... 250/227.14, 227.16, 250/227.18, 227.19, 227.23; 356/32, 35.5; 385/12, 13, 37; 73/800

(56) References Cited

U.S. PATENT DOCUMENTS 5,426,297 A * 6/1995 Dunphy et al. ........ 250/227.23

6,285,806 B1 * 9/2001 Kersey et al. ................ 385/12

* cited by examiner

*Primary Examiner*—Kevin Pyo
(74) *Attorney, Agent, or Firm*—Ware, Fressola, Van Der Sluys & Adolphson LLP

(57) ABSTRACT

The present invention provides a sensor system for sensing a parameter, comprising an optical source, coupler and signal processor system in combination with multiple structured fiber Bragg gratings. The optical source, coupler and signal processor system provide an optical source signal to the multiple structured fiber Bragg gratings. The optical source, coupler and signal processor system also responds to multiple structured fiber Bragg grating signals, for providing an optical source, coupler and signal processor system signal containing information about a sensed parameter. The multiple structured fiber Bragg gratings respond to the optical source signal, and further respond to the sensed parameter, for providing the multiple structured fiber Bragg grating signals containing information about a complex superposition of spectral responses or codes related to the sensed parameter. Each of the multiple structured fiber Bragg gratings includes a respective broadband spectral response or code related to the sensed parameter.

21 Claims, 5 Drawing Sheets

(BASIC SCHEMATIC OF A SPECTRAL-RESPONSE DIVISION MULTIPLEXED BRAGG GRATING SENSOR ARRAY)

(BASIC SCHEMATIC OF A WAVELENGTH MULTIPLEXED BRAGG GRATING SENSOR ARRAY KNOWN IN THE ART (PRIOR ART))

(BLOCK DIAGRAM OF A BRAGG GRATING SENSOR SYSTEM THAT IS THE SUBJECT MATTER OF THE PRESENT PATENT APPLICATION)

(THE WAVELENGTH DETECTOR SYSTEM)

(BASIC SCHEMATIC OF A SPECTRAL-RESPONSE DIVISION MULTIPLEXED BRAGG GRATING SENSOR ARRAY)

(BASIC SCHEMATIC OF A SPECTRAL-CODE DIVISION MULTIPLEXED BRAGG GRATING SENSOR ARRAY)

(BASIC SCHEMATIC OF A SPECTRAL-CODE TIME DIVISION MULTIPLEXED BRAGG GRATING SENSOR ARRAY)

BRAGG GRATING SENSOR SYSTEM WITH SPECTRAL RESPONSE OR CODE DIVISION MULTIPLEXING

BACKGROUND OF INVENTION

1. Technical Field

The present invention relates to a Bragg grating sensor system in which resonance characteristics of a grating reflector are tailored to provide each sensor element in a series of elements with a unique spectral identity, or signature. Unlike normal grating sensors, where the gratings need to be separated in wavelength, this feature allows several gratings to occupy the same wavelength space. The overlapping spectral features of each grating are detected via the use of a spectral, matched filter correlation technique.

2. Description of Related Art

FIG. 1 shows a sensor system that is known in the art and includes fiber Bragg grating based sensors that provide a wavelength encoded mode of operation. To multiplex several sensors along a fiber, each grating is typically assigned a certain wavelength range over which it is to operate. This method of wavelength division multiplexing (WDM) limits the number of sensors which can be multiplexed, particularly if the gratings are subjected to large strains or temperature changes which give rise to large wavelength shifts. For example, a fiber strain of about +/-1% requires an operational range of greater than +/-10 nanometers at 1.3 micrometers. For a source of 40 nanometer bandwidth, only 2 sensors could be accommodated under the source profile with this strain monitoring range sequence. In effect, in FIG. 1 the basic mode of operation of a wavelength division multiplexing (WDM) system (prior art) uses narrow spectral responses from each grating to make the measurement and provide discrimination between sensors.

In using Bragg gratings as sensors, it is often advantageous to maximize the responsivity, or scale factor. For example, in the transduction of pressure to strain, the larger the pressure-to-strain conversion factor (within constraints set by possible breakage of the fiber), the lower the minimum detectable pressure change will be for a given wavelength resolution capability. Unfortunately, when multiplexing grating sensors, the limited wavelength range that can be assigned to each sensor limits the responsivity that can be used.

SUMMARY OF INVENTION

The present invention provides a new and unique sensor system for sensing a parameter, comprising an optical source, coupler and signal processor system in combination with multiple structured fiber Bragg gratings.

The optical source, coupler and signal processor system provides an optical source signal to the multiple structured fiber Bragg gratings. The optical source, coupler and signal processor system also responds to multiple structured fiber Bragg grating signals, for providing an optical source signal, and also for providing an optical source, coupler and signal processor system signal containing information about a sensed parameter.

The multiple structured fiber Bragg gratings respond to the optical source signal, and further respond to the sensed parameter, for providing the multiple structured fiber Bragg grating signals containing information about a complex superposition of spectral responses or codes related to the sensed parameter.

Each of the multiple structured fiber Bragg gratings has a different spacing of one or more spectral components that are used to discriminate between the multiple structured fiber Bragg gratings.

Each of the multiple structured fiber Bragg gratings includes a respective broadband spectral response or code related to the sensed parameter. For example, each of the multiple structured fiber Bragg gratings may have separate gratings with either a unique broadband, multi-component, spectral response or spectral code. Each of the multiple structured fiber Bragg gratings may have a respective noise code. The respective noise code may include either maximal sequence codes or Gold codes.

The optical source, coupler and signal processing system may include either a broadband source or a scanning laser, or a broadband source with a scanning filter.

The optical source, coupler and signal processing system may also include either a scanning filter or wavelength resolving instrument to detect a net spectral response from the multi-structured fiber Bragg grating combination, or a simple detector, depending on the source as described above.

In contrast to the prior grating based sensor system, in the present invention each grating in the arrangement has a broadband response, typically giving a multi-component response. This type of response can be produced by writing a grating through a suitable amplitude mask. This type of grating is characterized by a central peak and a series of "sideband" peaks. These sidebands result due to the amplitude superstructure modulation of the grating. The spacing between the grating spectral components depends on the period of the superstructure amplitude mask period. The grating produced has a nominal center wavelength, or centroid wavelength which shifts with grating temperature or strain as with a "normal" narrowband grating.

In addition, the present invention also provides an approach to the multiplexing of gratings using a spectral coding approach which allows gratings to be used over the same wavelength range. The sensors are not wavelength division multiplexed (WDM), but spectral-code division multiplexed (SCDM).

The foregoing and other objects, features and advantages of the present invention will become more apparent in light of the following detailed description of exemplary embodiments thereof, as illustrated in the accompanying drawing.

DETAILED DESCRIPTION OF THE INVENTION

Figure 1:
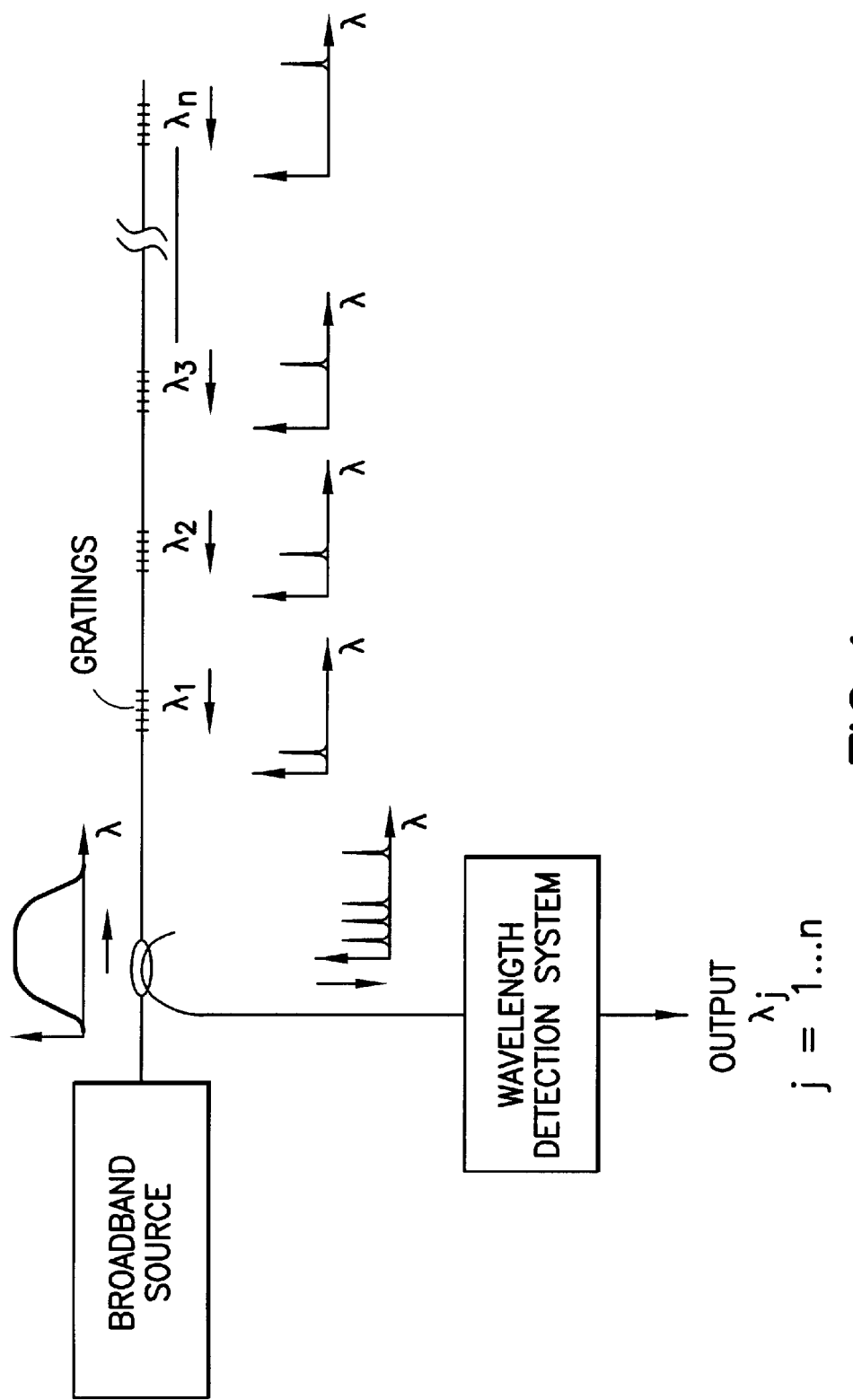
FIG. 1 is a basic schematic of a wavelength multiplexed Bragg grating sensor array.
Figure 2:
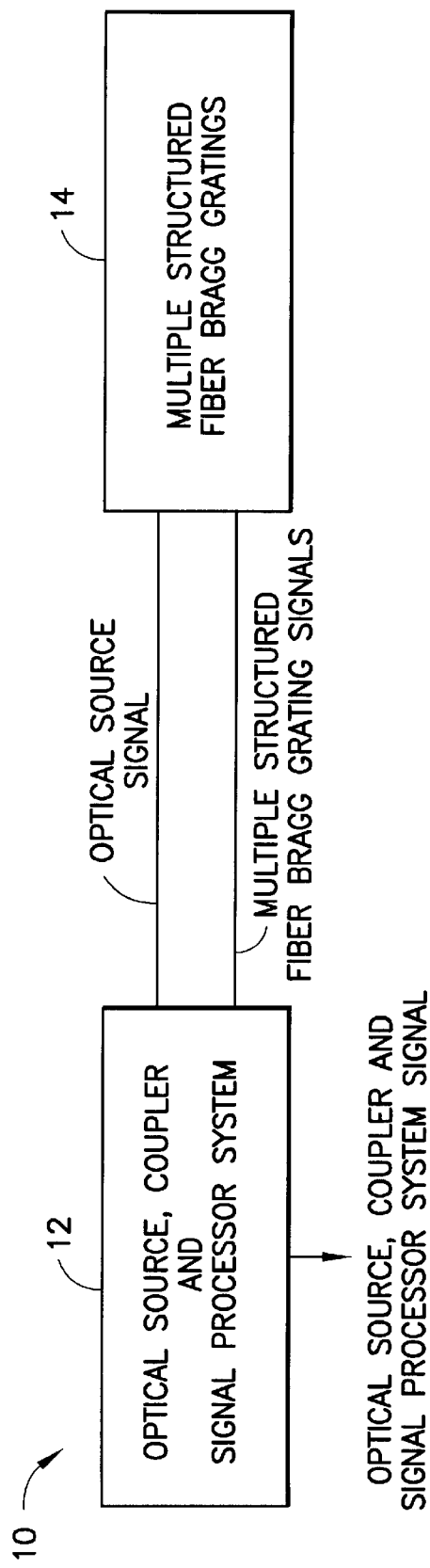
FIG. 2 is a block diagram of a Bragg grating sensor system that is the subject matter of the present patent application.

FIG. 2: The Basic Invention

FIG. 2 shows a new and unique sensor system generally indicated as 10 for sensing a parameter, including temperature or strain, having an optical source, coupler and signal processor system 12 in combination with multiple structured fiber Bragg gratings 14.

The optical source, coupler and signal processor system 12 provides an optical source signal to the multiple structured fiber Bragg gratings 14. The optical source, coupler and signal processor system 12 also responds to multiple structured fiber Bragg grating signals, for providing an optical source, coupler and signal processor system signal containing information about a sensed parameter.

The multiple structured fiber Bragg gratings 14 respond to the optical source signal, and further respond to the sensed parameter, for providing the multiple structured fiber Bragg grating signals containing information about a complex superposition of spectral responses or codes related to the sensed parameter.

Figure 3:
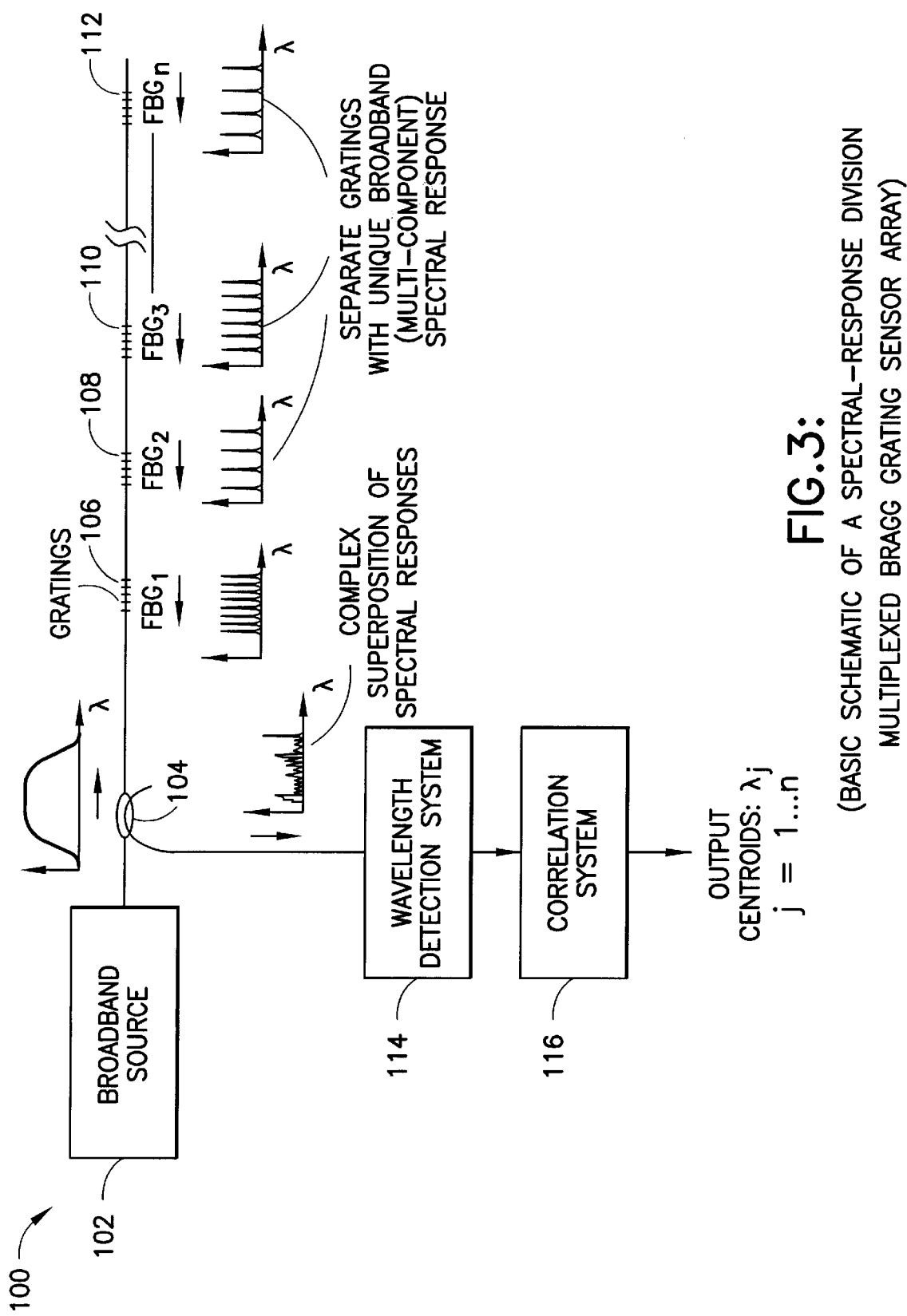
FIG. 3 is a basic schematic of a spectral-response division multiplexed Bragg grating sensor array.

FIG. 3: Spectral Response

FIG. 3 shows one embodiment of the sensor system generally indicated as 100 and consistent with the sensor system 10 shown in FIG. 2.

The sensor system 100 uses broadband responses, where the grating responses comprises multiple spectra. In FIG. 3, a broadband source 102 provides via a coupler 104 a broadband optical light signal to multiple structured gratings 106, 108, 110, . . . , 112 ($FBG_1$, $FBG_2$, $FBG_3$, $FBG_4$). Each of the multiple structured gratings 106, 108, 110, . . . , 112 has different spacings of their spectral components (frequency) as shown in FIG. 3 and are serially configured. Each of the multiple structured gratings 106, 108, 110, . . . , 112 has separate gratings with a unique broadband (multi-component) spectral response. The multiple structured gratings 106, 108, 110, . . . , 112 are arranged to provide low reflectivity (weak gratings). Since the multiple structured gratings 106, 108, 110, . . . , 112 occupy the same wavelength range, the reflected signal from the array, in the form of multiple fiber Bragg grating signals, comprises a complex overlapping superposition of the multi-spectral line grating reflection spectra (aka spectral responses), and is coupled via a coupler 104 to a wavelength detection system 114. A scanning filter, or other wavelength-resolving instrument, can be used to detect the net spectral return from the array.

The signal processing system includes the wavelength detection system 114 and a correlation system 116. The wavelength detection system 114 provides a wavelength detection system signal to a correlation system 116. If a spectral line spacing of each of the multiple structured gratings 106, 108, 110, . . . , 112 is known a priori, the correlation system 116 uses correlation based matched filtering to determine the shift in the position of a respective centroid wavelength of each of the multiple structured gratings 106, 108, 110, . . . , 112 in the array. In operation, the wavelength detection system 114 stores the spectral characteristics of each grating and then correlates the total output with the stored response. The correlation process leads to the determination of the centroid wavelength of the sensor gratings in the array.

The "code" used in the above example is a simple "frequency" based code, i.e. the spacing between the grating spectral lines is used to discriminate between gratings. This approach results in a limited ability to multiplex gratings due to the limited range of component spacings which can be effectively used.

The broadband source 102, coupler 104, multiple structured gratings 106, 108, 110, . . . , 112 ($FBG_1$, $FBG_2$, $FBG_3$, $FBG_4$), wavelength detection system 114 and correlation system 116 are all known in the art, and the scope of the invention is not intended to be limited to any particular type or kind thereof.

Figure 4A:
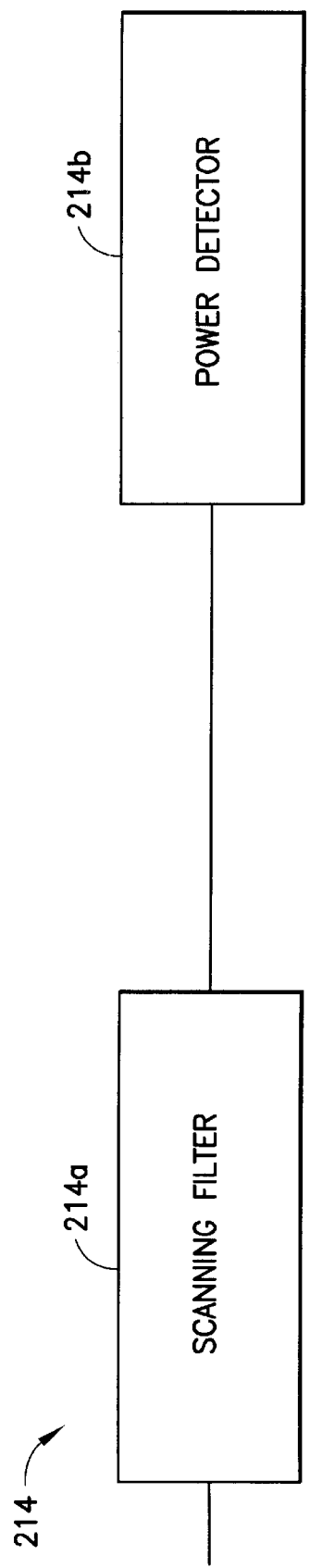
FIG. 4a is a block diagram of a wavelength detection system shown in FIG. 4.
Figure 4:
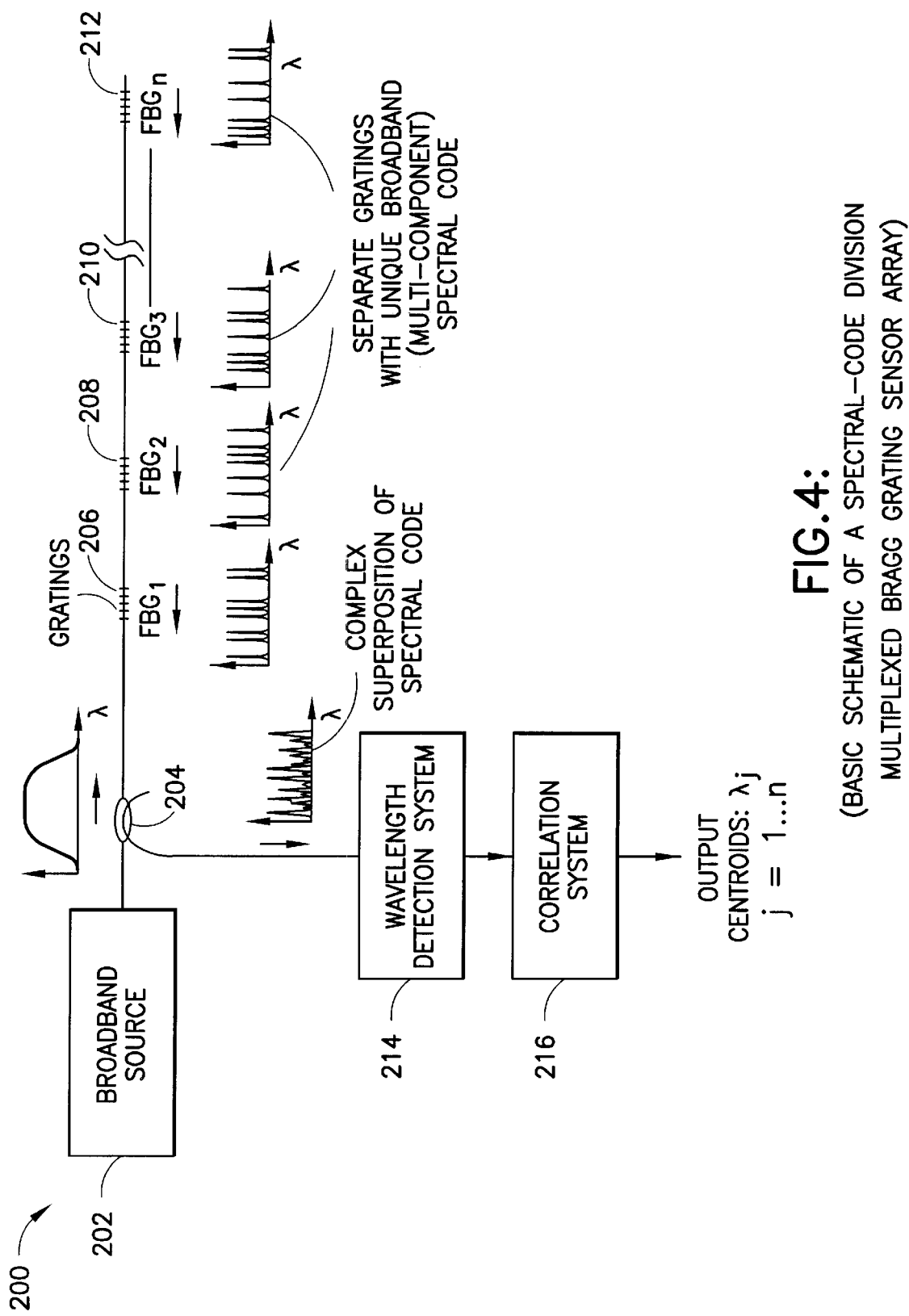
FIG. 4 is a basic schematic of a spectral-code division multiplexed Bragg grating sensor array.

FIG. 4: Spectral Coding

FIG. 4 shows another embodiment of the sensor system generally indicated as 200. The reference numerals used in FIG. 4 are substantially the same for similar elements as the reference numerals used in FIG. 3 with the addition of 100.

In FIG. 4, a broadband source 202 provides via a coupler 204 a broadband optical light signal to multiple structured gratings 206, 208, 210, . . . , 212 ($FBG_1$, $FBG_2$, $FBG_3$, $FBG_4$). Each of the multiple structured gratings 206, 208, 210, . . . , 212 has separate gratings with a unique broadband (multi-component) spectral code. The multiple structured gratings 206, 208, 210, . . . , 212 provide multiple structured grating signals having a complex superposition of spectral codes via the coupler 204 back to the wavelength detection system 214.

The sensor system 200 utilizes a more complex code applied to multiple structured gratings 206, 208, 210, . . . , 212 than the sensor system in FIG. 3. The complex code can be produced by using a noise-like code amplitude modulation of the multiple structured gratings 206, 208, 210, . . . , 212. Noise codes with the appropriate characteristics include maximal-sequence codes (m-codes) and Gold codes. Both types of noise codes are routinely used in spread spectrum type communications systems, for example. The use of code modulation permits each grating spectral response to be characterized by a particular code, represented by logical "1"s and "0"s by the existence or lack of a reflection peak at a series of predetermined wavelengths. The type of coding desired may be produced either via the amplitude encoding of the grating (through a noise code on the amplitude), or by writing multiple grating components (i.e. separately writing each spectral component) at each sensor point. Such composite multi-grating sensors could be produced with the gratings written over each other (collocated) or immediately adjacent to each other (or a combination of the two). The scope of the invention is not intended to be limited to any particular noise code, or the manner in which the code is imparted in the optical fiber.

This type of spectral code based interrogation would allow a number of sensors, each with its own unique code, to occupy the same wavelength space. The strong autocorrelation characteristics of such codes would also permit accurate determination of the centroid wavelength.

The Wavelength Detection System 214

In FIG. 4, the wavelength detection system 214 and the correlation system 216 are two separate and distinct systems that perform different functions.

In this embodiment, the broadband source 202 is used and separate spectral codes are reflected from the gratings 106, 108, 110, 112 to the wavelength detection system 214. FIG. 4a shows the wavelength detection system 214 which includes a scanning filter 214a and a power detector 214b. The scanning filter 214a scans for a particular wavelength and then passes it to the power detector 214b. The power detector 214b responds to a scanning filter signal containing information about the particular wavelength, and provides a power spectral density signal to the correlation system 216.

Figure 5:
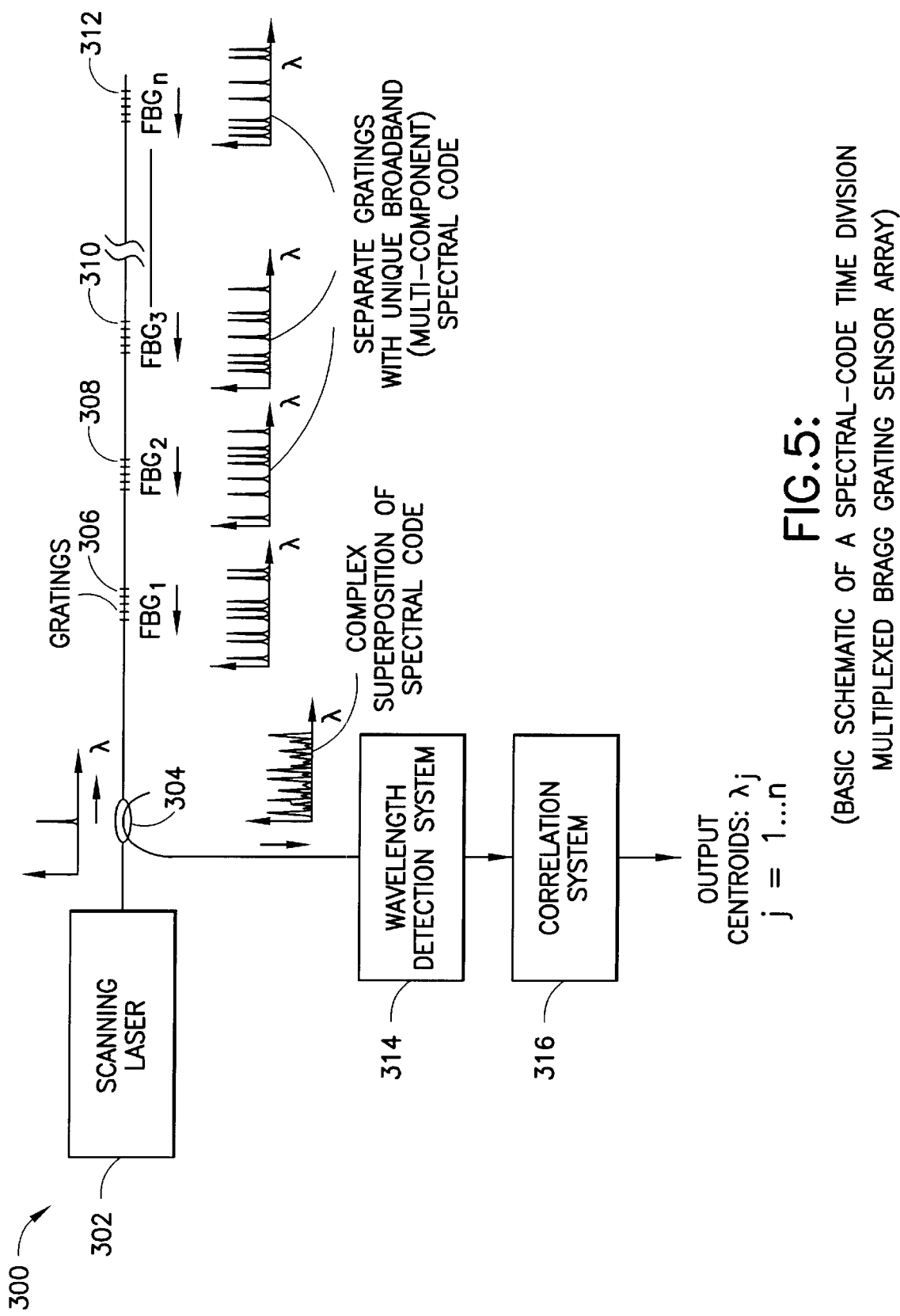
FIG. 5 is a basic schematic of a spectral-code time division multiplexed Bragg grating sensor array.

FIG. 5: Spectral Coding Time With Division Multiplexing

FIG. 5 shows still another embodiment of the sensor system generally indicated as 300. The reference numerals used in FIG. 5 are substantially the same for similar elements as the reference numerals used in FIG. 4 with the addition of 100.

In FIG. 5, a scanning laser 302 provides via a coupler 304 a scanning laser optical light signal to multiple structured gratings 306, 308, 310, ..., 312 ($FBG_1$, $FBG_2$, $FBG_3$, $FBG_4$).

Each of the multiple structured gratings 306, 308, 310, ..., 312 has separate gratings with a unique broadband (multi-component) spectral code. The multiple structured gratings 306, 308, 310, ..., 312 provide multiple structured grating signals having a complex superposition of spectral codes via the coupler 304 back to the wavelength detection system 314.

In comparison to the embodiment in FIG. 4, the broadband source 202 (FIG. 4) is replaced by the scanning laser source 302 (FIG. 5) that produces a single wavelength of light on a time dependent schedule. In this embodiment, the detection system 314 comprises only a detector (indicated as 314) that receives the reflected wavelengths that are coincident with the particular gratings in a time dependent fashion. The detector 314 provides the same type of power spectral density signal to the correlation system 316. The benefit of this embodiment is that the scanning laser source 302 can provide a higher power level at a particular wavelength than the broadband source 202 in FIG. 4 is capable of providing. It further makes the detection system 314 less complicated.

Similar to the embodiment in FIG. 4, the alternative sensor system 300 utilizes a more complex code applied to multiple structured gratings 206, 208, 210, ..., 212 than the sensor system in FIG. 3.

Scope of the Invention

The broadband source, scanning laser, couplers, multiple structured gratings, wavelength detection systems and correlation systems are all elements that are known in the art, and the scope of the invention is not intended to be limited to any particular type or kind thereof.

Although the invention has been described and illustrated with respect to exemplary embodiments thereof, the foregoing and various other additions and omissions may be made therein and thereto without departing from the spirit and scope of the present invention.

We claim:

1. A sensor system for sensing a parameter, comprising:
an optical source, coupler and signal processor system, for providing an optical source signal, responsive to multiple structured fiber Bragg grating signals, for providing an optical source, coupler and signal processor system containing information about a sensed parameter; and
multiple structured fiber Bragg gratings, responsive to the optical source signal, and further responsive to the sensed parameter, for providing the multiple structured fiber Bragg grating signals containing information about a complex superposition of spectral responses or codes related to the sensed parameter.

2. A sensor system according to claim 1,
wherein each of the multiple structured fiber Bragg gratings includes a respective broadband spectral response or code related to the sensed parameter.

3. A sensor system according to claim 1,
wherein the optical source, coupler and signal processing system includes a broadband light source, a coupler, a wavelength detection system and a correlation system;
wherein the broadband light source provides the optical source signal;

wherein the coupler responds to the optical signal, for providing a coupled optical signal to the multi-structured fiber Bragg gratings, and responds to the multiple structured fiber Bragg grating signals, for providing coupled multiple structured fiber Bragg grating signals;
wherein the wavelength detection system responds to the coupled multiple structured fiber Bragg grating signals, for providing a wavelength detection system signal containing information about a wavelength detection of the multiple structured fiber Bragg grating signals; and
wherein the correlation system responds to the wavelength detection system signal, for providing a correlation system signal containing information about the sensed parameter.

4. A sensor system according to claim 1,
wherein each of the multiple structured fiber Bragg gratings has a different spacing of a respective spectral component that is used to discriminate between the multiple structured fiber Bragg gratings.

5. A sensor system according to claim 4,
wherein the multiple structured fiber Bragg gratings are serially configured.

6. A sensor system according to claim 1,
wherein the optical source, coupler and signal processing system includes either a scanning filter or wavelength resolving instrument to detect a net spectral response from the multi-structured fiber Bragg gratings.

7. A sensor system according to claim 1, wherein each of the multiple structured fiber Bragg gratings has separate gratings with a unique broadband, multi-component, spectral response.

8. A sensor system according to claim 1,
wherein each of the multiple structured fiber Bragg gratings has separate gratings with a unique broadband, multi-component, spectral code.

9. A sensor system according to claim 1,
wherein each of the multiple structured fiber Bragg gratings has a respective noise code.

10. A sensor system according to claim 9,
wherein the respective noise code includes either maximal sequence codes or Gold codes.

11. A sensor system according to claim 3, wherein the wavelength detection system includes a scanning filter and a power detector, the scanning filter scanning for a particular wavelength for passing to the power detector.

12. A sensor system according to claim 1,
wherein the optical source, coupler and signal processing system includes a scanning laser, a coupler, a wavelength detection system and a correlation system;
wherein the scanning laser provides the optical source signal in the form of a scanning laser signal;
wherein the coupler responds to the scanning laser signal, for providing a coupled scanning laser signal to the multiple structured fiber Bragg gratings, and responds to the multiple structured fiber Bragg grating signals, for providing coupled multiple structured fiber Bragg grating signals;
wherein the wavelength detection system responds to the coupled multiple structured fiber Bragg grating signals, for providing a wavelength detection system signal containing information about a wavelength detection of the multiple structured fiber Bragg grating signals; and
wherein the correlation system responds to the wavelength detection system signal, for providing a correlation system signal containing information about the sensed parameter.

13. A sensor system according to claim 12, wherein the wavelength detection system comprises a detector that receives reflected wavelengths that are coincident with a respective multiple structured fiber Bragg grating in a time dependent fashion.

14. A sensor system for sensing a parameter having an optical source and a signal processor system, characterized in that the sensor system comprises multiple structured fiber Bragg gratings that respond to an optical source signal from the optical source, and further respond to a sensed parameter, for providing multiple structured fiber Bragg grating signals containing information about a complex superposition of spectral responses or codes related to the sensed parameter.

15. A sensor system according to claim 14, wherein each of the multiple structured fiber Bragg gratings includes a respective broadband spectral response or code related to the sensed parameter.

16. A sensor system according to claim 14, wherein each of the multiple structured fiber Bragg gratings has a different spacing of a respective spectral component that is used to discriminate between the multiple structured fiber Bragg gratings.

17. A sensor system according to claim 16, wherein the multiple structured fiber Bragg gratings are serially configured.

18. A sensor system according to claim 14, wherein each of the multiple structured fiber Bragg gratings has separate gratings with a unique broadband, multi-component, spectral response.

19. A sensor system according to claim 14, wherein each of the multiple structured fiber Bragg gratings has separate gratings with a unique broadband, multi-component, spectral code.

20. A sensor system according to claim 14, wherein each of the multiple structured fiber Bragg gratings has a respective noise code.

21. A sensor system according to claim 20, wherein the respective noise codes include either maximal sequence codes or Gold codes.

* * * * *